United States Patent [19]

Sasazawa et al.

[11] 4,200,680

[45] Apr. 29, 1980

[54] PROCESS FOR PREPARING MAGNETIC IRON OXIDE AND MAGNETIC IRON OXIDE PRODUCED THEREBY

[75] Inventors: Koji Sasazawa; Shigeo Komine; Tatsuji Kitamoto; Goro Akashi, all of Odawara, Japan

[73] Assignee: Fuji Photo Film Co., Ltd., Minami-ashigara, Japan

[21] Appl. No.: 586,443

[22] Filed: Jun. 12, 1975

[30] Foreign Application Priority Data

Jun. 13, 1974 [JP] Japan .................................. 49-67300

[51] Int. Cl.² ............................................. H01F 10/02
[52] U.S. Cl. ...................................... 428/403; 427/48; 427/128; 427/215; 427/217; 427/377; 427/383.3; 428/900
[58] Field of Search ........................... 427/48, 127–132, 427/377, 215, 217, 383 A; 428/900, 403; 252/62.54

[56] References Cited

U.S. PATENT DOCUMENTS

| 3,573,980 | 4/1971 | Haller et al. | 427/48 |
| 3,770,500 | 11/1973 | Imaoka et al. | 427/132 |

*Primary Examiner*—Bernard D. Pianalto
*Attorney, Agent, or Firm*—Sughrue, Rothwell, Mion, Zinn and Macpeak

[57] ABSTRACT

A magnetic iron oxide having a large coercive force and an improved squareness ratio prepared by coating the surface of needle-like particles of magnetic iron oxide with a cobalt compound, placing the coated iron oxide particles in a unidirectionally oriented magnetic field thereby orienting the particles in the direction of the magnetic field, and heat-treating the needle-like particles in this state with the application of an external magnetic field, or heat-treating the needle-like particles in a magnetized state.

10 Claims, No Drawings

PROCESS FOR PREPARING MAGNETIC IRON OXIDE AND MAGNETIC IRON OXIDE PRODUCED THEREBY

BACKGROUND OF THE INVENTION

1. Field of the Invention

This invention relates to a process for preparing magnetic iron oxide, and more specifically, to a process for preparing improved magnetic iron oxide by doping Co into the iron oxide and increasing the magnetic anisotropy of the resulting magnetic iron oxide powder having a large coercive force.

2. Description of the Prior Art

Production of high density magnetic recording materials requires magnetic materials having a large coercive force and a high squareness ratio (the ratio between the residual magnetic flux and the saturated or maximum magnetic flux).

In order to increase the coercive force of a magnetic powder of the iron oxide type, it is effective to dissolve Co in the magnetic powder, and various methods for achieving this have been proposed in the past, for example, as disclosed in U.S. Pat. No. 3,117,933, U.S. Pat. No. 3,671,435, Japanese Patent Publication No. 6,113/67, Japanese Patent Publication No. 27,719/66 (corresponding to U.S. Pat. No. 3,573,980), Japanese Patent Publication No. 15,759/73, and Japanese Patent Publication No. 10,994/73.

In order to obtain a high squareness ratio, it is known to orient the needle-like particles using a magnetic field orienting treatment while the coating composition containing the particles is still in the form of a coating or before the coating composition has been dried, and in the case of Co-containing iron oxide, especially iron oxide of the magnetite type containing $Fe^{++}$ ion, it is known the squareness ratio can be improved by a magnetic annealing treatment in a magnetic field. Methods utilizing this approach are disclosed, for example, in Japanese Patent Publication No. 18,282/61 (corresponding to British Pat. No. 951,104), Japanese Patent Publication No. 5,927/61 (corresponding to U.S. Pat. No. 3,026,215), and Japanese Patent Publication No. 17,113/64.

The present invention relates to a further improvement of these prior techniques, and relates to an improvement of the magnetic annealing treatment mentioned above.

SUMMARY OF THE INVENTION

An object of this invention is to provide a process for improving the squareness ratio of iron oxide containing Co.

Another object of this invention is to provide a process for improving the squareness ratio of iron oxide containing Co by a magnetic annealing treatment.

A more specific object of this invention is to provide a process for improving the squareness ratio of iron oxide containing Co wherein the needle-like iron oxide particles are oriented in a magnetic field so that their longitudinal directions are aligned, while the Co compound is present near the surface of the iron oxide particles without being magnetically integrated with the iron oxide particles, and then the oriented iron oxide particles are heated to a temperature at which the Co compound decomposes and Co begins to diffuse into the iron oxide particles thereby to superpose the anisotropy ascribable to the form of the iron oxide particles on the induced magnetic anisotropy ascribable to the directional order of the Co ion.

Accordingly this invention provides a process for preparing magnetic iron oxide, which comprises coating the surface of needle-like particles of magnetic iron oxide with a cobalt compound, placing the coated iron oxide particles in a unidirectionally oriented magnetic field thereby to orient most of the needle-like particles in the direction of the magnetic field, and heat-treating the needle-like particles in this condition with the application of an external magnetic field, or heat-treating the needle-like particles in a magnetized state.

DETAILED DESCRIPTION OF THE INVENTION

It is known that the needle-like axis of magnetite ($Fe_3O_4$) or maghemite ($\gamma\text{-}Fe_2O_3$) starting from goethite ($\alpha\text{-}FeOOH$) is oriented in the direction of the $<110>$ planes, and the induced magnetic anisotropy chooses one of the directions in the $<111>$ planes.

Induced magnetic anisotropy is described, for example, in Soshin Chikazumi, *Physics of Ferromagnetism*, 6th Edition, pages 254–267, published by Syokabo, Tokyo (Aug. 10, 1968).

When ordinary powders are cooled in a magnetic field, the anisotropy ascribable to the needle-like particles does not contribute to the magnetic anisotropy of the entire system after magnetic annealing treatment, but rather tends to impede the system magnetic anisotropy, because the needle-like axes in the particles point in random directions. With a view to improving this tendency, an attempt was made to cool a magnetic material, which has been oriented in a magnetic field (see, for example, Japanese Patent Publication No. 18,282/61), in a magnetic field. However, once the needle-like particles have been doped with Co, it is difficult to align the longitudinal directions of the needle-like particles sufficiently with a magnetic field orientation, and a mechanical orienting treatment must be used concurrently to aid in the orientation. This is because the crystal magnetic anisotropy of Co is in the direction of the $<100>$ planes, and has a very large value.

The present invention solves these problems. According to this invention, needle-like ferromagnetic iron oxide particles which do not contain any Co are dispersed in an aqueous slurry or a medium containing a small amount of a viscous material, and the long axes of the needle-like particles are aligned in a static magnetic field or an alternating magnetic field in a condition in which the individual needle-like crystals can move. The liquid medium is then removed by various treatments such as filtration, evaporation, or drying to obtain a cake of ferromagnetic iron oxide in which the needle-like axes have been aligned.

In the above procedure, a cobalt compound is caused to be present on the surface of, or in the vicinity of the surface of, the needle-like particles in intimate contact with the particles. This can be accomplished by the various methods disclosed, for example, in Japanese Patent Publication Nos. 6,113/67 (corresponding to U.S. Pat. No. 3,047,505), 27,719/66 (corresponding to U.S. Pat. No. 3,573,980), 10,994/73 (corresponding to British Pat. No. 1,318,579), and 15,759/73, and U.S. Pat. No. 3,671,435. These methods include:

(1) Needle-like ferromagnetic iron oxide particles are dispersed in a solution containing cobalt compounds and alkali is added to the solution. The solution is stirred and cobalt hydroxide covers or adheres to the particles.

(2) Needle-like ferromagnetic iron oxide particles are dipped in a solution containing cobalt compounds and dried. As a result, cobalt adheres to the particles.

(3) Needle-like ferromagnetic iron oxide particles are plated using an electro-plating bath or an electroless plating bath containing cobalt ion, and then as a result, the particles are covered or adhered to the cobalt. Alternatively, a procedure in which a cobalt salt is diffused into a cake of the needle-like ferromagnetic iron oxide particles which have been subjected to an orienting treatment, and then dried can be used.

The resulting Co-containing needle-like ferromagnetic iron oxide whose needle-like axes are oriented is then heated to a temperature of at least about 200° C. in a magnetic field in a non-oxidizing atmosphere, for example, an atmosphere of an inert gas, e.g., $N_2$, He, Ne, Ar, Kr or Xe to decompose the Co salt and diffuse the Co into the iron oxide particles. The ferromagnetic iron oxide is then cooled as such in the magnetic field to produce a Co-doped magnetic material having a good squareness ratio and a large coercive force. The magnetic field employed above can be an externally applied field or a magnetic field formed as a result of the magnetization of the particles themselves. Furthermore, the magnetic field can be applied using either a direct current or an alternating current.

Desirably, the axial ratio of the needle-like particles is about 2:1 to about 20:1, and a suitable average particle size is about 0.2 to 2 $\mu$m. Especially preferred species of iron oxides are those having an especially large magnetic shape anisotropy shown by the Hc (coercive force) such as maghemite, magnetite or Berthollide iron oxide (described hereinafter), of from about 380 Oe to about 500 Oe, respectively.

The effect of the self-magnetic field annealing treatment which is a characteristic feature of the present invention is greater with particles where Co is not present having a higher Hc, that is, particles whose Hc ascribable to shape anisotropy is higher.

Maghemite ($\gamma$-$Fe_2O_3$) and magnetite ($Fe_3O_4$) can be used as the iron oxide, but Berthollide iron oxide ($FeO_x$ where x is the oxidation degree) which is disclosed in Japanese Patent Publication Nos. 5,009/64, 10,307/64 and 39,639/73) is especially effective presumably because diffusion of Co into such an oxide is easy. Berthollide iron oxides ($FeO_x$) having an oxidation degree, as defined by the following relationship, of about 15 to 90% are especially effective.

$$\text{Degree of Oxidation} = 1 - \frac{300 - y}{100 - y} \cdot R$$

wherein y represents the divalent atomic percent of metal ions other than $Fe^{++}$, and R is the ratio of $Fe^{++}/^{++} - Fe^{+++}$.

In the above-described Berthollide iron oxide, x ranges from more than 1.33 to less than 1.50, preferably 1.36 to 1.49. The Berthollide iron oxide is produced by following process.

(a) A reduction of maghemite ($FeO_x$, x=1.50) to magnetite ($FeO_x$, x=1.33) where the reduction is stopped when 1.33<x<1.50 as set forth in Japanese Patent Publication Nos. 5,009/64 and 39,639/73.

(b) An oxidation process of magnetite to maghemite where the oxidation is stopped when 1.33<x<1.50 as described in Japanese Patent Publication Nos. 5,009/64 and 10,307/64.

Berthollide iron oxide produced by processes as described above is an iron oxide having an oxidation degree between that of magnetite ($Fe_3O_4$: $FeO_x$, x=1.33) and the maghemite ($\gamma$-$Fe_2O_3$: $FeO_x$, x=1.50), and having a very high coercive force, decreased electrical resistance, and improved dispersibility in an organic solvent. Then, the transfer effect of a recorded signal to another magnetic recording layer is decreased. On the other hand, maghemite and magnetite can be used in combination, and the characteristics thereof are similar but not superior to those of the above-described Berthollide iron oxide.

Various known techniques can be used to disperse the iron oxide uniformly and mix the iron oxide intimately with the Co compound. For example, the above-described iron oxide is dispersed in water. An aqueous solution of cobalt chloride ($CoCl_2$) is added to the dispersion, and ammonia is added to form a cobalt salt (hydroxide). Continuous stirring produces needle-like iron oxide to which cobalt hydroxide adheres.

Suitable examples of cobalt compounds which can be used include the oxides, inorganic acid salts, organic acid salts, and hydroxides of cobalt, and metallic cobalt and cobalt alloys can also be used. Specific examples of suitable materials are cobalt oxide, cobalt-containing oxides, cobalt nitrate, cobalt chloride, cobalt formate, cobalt acetate, cobalt hydroxide, cobalt-containing hydroxides, Co, and Co-Fe alloy. Of these cobalt compounds, cobalt oxide and cobalt hydroxide are particularly preferred.

The Co content of the needle-like magnetic iron oxide coated with the Co compound is about 0.5 to 10 atomic percent. The magnetic iron oxide thus-treated is then transferred to a vessel in a magnetic field and an intensity of 800 Oe, and oriented while stirring the material or applying ultrasonic vibration to the material, after which the excess water is removed. Drying is carried out slowly below the boiling point so that the arrangement of the iron oxide particles is not disordered. Preferably, the drying is carried out in a magnetic field, the strength of which preferably exceeds the coercive force of the magnetic iron oxide.

For practical purposes, the intensity of the magnetic field during treatment and drying is at least about 300 Oe, and superposition of an alternating current magnetic field thereon is also effective.

It is not necessary for the drying to be carried out until there is no volatile component remaining, and it is sufficient if the drying is carried out to an extent such that the volatile content is reduced to about 5% or less. This is effective for preventing the phenomenon in the subsequent heat-treatment which resembles "bumping" whereby the state of the particles is broken. After the magnetic annealing treatment, the particle block or cake is comminuted to powder.

After the above treatment, the needle-like magnetic iron oxide particles coated with the cobalt compound are in the form of blocks, and magnetized as a result of the orienting treatment. Preferably, the blocks are subjected to the subsequent heat-treatment without pulverizing and demagnetizing the blocks.

Preferably, the heat-treatment is carried out in a non-oxidizing atmosphere, that is, in an atmosphere of an inert gas such as $N_2$, He, Ne, Ar, Kr or Xe.

The effective heating temperature is at least the point at which the decomposition of the Co salt and the diffusion of Co into the iron oxide take place and is within the range in which the needle-like particles are not sintered to an extent that the outer shape of the needle-like particles is broken. In other words, the effective heating temperature is at least about 200° C., but not higher than about 800° C., preferably 300° to 400° C.

Desirably, after diffusing the Co in this way, the magnetic iron oxide is annealed in a magnetic field to a temperature of below about 100° C. In the present invention in which the magnetic field is sufficient to orient the needle-like ferromagnetic iron oxide particles and uni-directionally magnetize the particles, that is, they have a coercive force (Hc) exceeding that of magnetic iron oxides (for example, maghemite, magnetite, or $FeO_x$), for example, a coercive force of about 800 to 1,500 Oe, the use of an external magnetic field can be omitted even in the stages of the decomposition of the Co salt, the diffusion of the Co and the subsequent annealing. This process is called "auto-magnetic annealing" which is very advantageous for commercial operations because there is no need to apply a magnetic field during the heat-treatment.

A viscous substance, that is, a thickener, can be added in order to increase the orientability of the Co-coated needle-like magnetic iron oxide in a magnetic field in an aqueous slurry.

The thickener can be a synthetic or natural hydrophilic polymeric compound. Examples of suitable thickeners include gelatin, acylated gelatins such as phthalic-modified gelatin or maleic-modified gelatin, grafted gelatins resulting from the grafting of acrylic acid, methacrylic acid or the amide derivatives thereof to gelatin, polyvinyl alcohol, polyhydroxyalkyl acrylates, polyvinyl pyrrolidone, a copolymer of vinyl pyrrolidone and vinyl acetate, casein, agarose, alginic acid, sodium alginate, polysaccharides, polyacrylamide, acylated polyethylenimines, copolymers of acrylamide, N-substituted acrylamide or N-substituted methacrylamide, soluble starch, hydroxyethyl starch, hydroxypropyl starch, dextran, gum arabic, albumin, methyl cellulose, ethyl cellulose, hydroxyethyl cellulose, hydroxypropylmethyl cellulose, cellulose tetrahydrophthalate, carboxymethyl cellulose, carboxyethyl cellulose, and corn starch. These materials can be used either individually or in admixture. A suitable amount of the thickener which can be added is an amount which provides an aqueous slurry with a viscosity of about 30 to about 300 poises.

The magnetic iron oxide thus-obtained by the process of this invention can be used as a magnetic recording medium in the same way as in the case of conventional binder-type magnetic recording media. The magnetic iron oxide doped with Co has a high coercive force ranging from about 400 to 1,500 Oe. Further, when such are employed in a magnetic recording tape, the squareness ratio (Br/Bs) obtained ranges from about 0.75 to 0.9.

The binder used in a magnetic recording medium for binding the Co-containing iron oxide particles can be a conventional thermoplastic resin, thermosetting resin, or a mixture thereof.

Useful thermoplastic resins have a softening point of lower than about 150° C., a mean molecular weight of about 10,000 to 200,000 and a degree of polymerization of about 200 to 2,000, and include the following polymers; vinyl chloride-vinyl acetate copolymers, vinyl chloride-vinylidene chloride copolymers, vinyl chloride-acrylonitrile copolymers, acrylic ester-vinylidene chloride copolymers, acrylic ester-styrene copolymers, methacrylic ester-acrylonitrile copolymers, methacrylic ester-vinylidene chloride copolymers, methacrylic ester-styrene copolymers, urethane elastomers, polyvinyl fluoride resins, vinylidene-chloride-acrylonitrile copolymers, butadiene-acrylonitrile copolymers, polyamide resins, polyvinyl butyral, cellulose derivatives (cellulose acetate butyrate, cellulose diacetate, cellulose triacetate, cellulose propionate, nitrocellulose), styrene-butadiene copolymers, polyester resins, chlorovinyl ether-acrylic ester copolymers, amino resins, various synthetic rubber resins and mixtures thereof.

These thermoplastic binder resins are described in Japanese Patent Publication Nos. 6,877/62, 12,528/64, 19,282/64, 5,349/65, 20,907/65, 9,463/66, 14,059/66, 66,985/66, 6,428/67, 11,621/67, 4,623/68, 15,206/68, 2,889/69, 17,947/69, 18,232/69, 14,020/70, 14,500/70, 18,573/72, 22,068/72, 22,069/72, 22,070/72, and 27,886/72, and U.S. Pat. Nos. 3,144,352, 3,419,420, 3,499,789 and 3,713,887.

Useful thermosetting resins have a molecular weight of less than about 200,000 as a coating solution, but the molecular weight becomes infinity due to the condensation and addition reactions occurring on heating the coating solution. Such resins are preferably not softened or melted before they thermally decompose. Examples of thermosetting resins are phenol resins, epoxy resins, polyurethane hardening resins, urea resins, melamine resins, alkyd resins, silicone resins, acrylic reactive resins, epoxy-polyamide resins, nitrocellulose-melamine resins, a mixture of a high molecular weight polyester resin and an isocyanate prepolymer, a mixture of a methacrylic copolymer and a diisocyanate prepolymer, a mixture of a polyesterpolyol and a polyisocyanate, urea-formaldehyde resins, a mixture of a low molecular weight glycol, a high molecular weight diol and triphenylmethanetriisocyanate, polyamine resins and mixtures thereof.

These resins are described in Japanese Patent Publication Nos. 8,103/64, 9,779/65, 7,192/66, 8,106/66, 14,275/66, 18,179/67, 12,081/68, 28,023/69, 14,501/70, 24,902/70, 13,103/71, 22,065/72, 22,066/72, 22,067/72, 22,072/72, 22,073/72, 28,045/72, 28,048/72 and 28,922/72, and U.S. Pat. Nos. 3,144,353, 3,320,090, 3,437,510, 3,597,273, 3,781,210, and 3,781,211.

The binder can be used individually or as mixtures thereof. Other ingredients, such as dispersing agents, lubricants, abrasive agents and anti-static agents, can be added to the binder. The weight ratio of the ferromagnetic powder to the binder can suitably range from about 100:10 to 100:200.

Useful dispersing agents are caprylic acid, capric acid, lauric acid, myristic acid, palmitic acid, stearic acid, oleic acid, elaidic acid, linoleic acid, linolenic acid, stearolic acid or like fatty acids represented by the formula $R_1COOH$ (where $R_1$ is an alkyl or alkenyl group having 11 to 17 carbon atoms), alkali metal (Li, Na, K, etc.) or alkaline earth metal (Mg, Cs, Ba, etc.) salts of these fatty acids, and lecithin. Higher alcohols having more than 12 carbon atoms and the sulfuric esters thereof can be used.

Such a dispersing agent is employed in the binder in a weight ratio of the dispersing agent to the binder of about 10:100 to 20:100. Suitable dispersing agents are described in Japanese Patent Nos. 28,369/64, 17,945/69 and 15,001/73, and U.S. Pat. Nos. 3,387,993 and 3,470,021.

Useful lubricants are silicone oils, graphite, molybdenum disulfide, tungsten disulfide, fatty acid esters of monocarboxylic fatty acids having 12 to 16 carbon atoms and monohydric alcohols having 3 to 12 carbon atoms, and fatty acid esters of monocarboxylic fatty acids having more than 17 carbon atoms and monohydric alcohols, in which the total number of carbon atoms in the ester is 15 to 28. 0.2 to 20 weight parts of such a lubricant are generally employed per 100 parts of the binder. These lubricants are described in Japanese Patent Publication Nos. 23,889/68, and 28,043/72, Japanese Patent Application Nos. 28,647/67 and 81,543/68, and U.S. Pat. No. 3,423,233.

Useful abrasives are fused alumina, silicon carbide, chromium oxide, corundum, synthetic corundum, diamond, synthetic diamond, garnet and emery (main components are corundum and magnetite). A suitable abrasive has a mean particle size of about 0.05 to 2 $\mu$m, preferably 0.1 to 2 $\mu$m. Generally about 7 to 20 weight parts of the abrasive particles are employed per 100 weight parts of the binder. These abrasives are described in Japanese Patent Application No. 26,749/73.

Useful anti-static agents are inorganic materials such as carbon black; organic materials such as saponin or like natural surfactants, alkyleneoxides, glycerin, glycidol or like nonionic surfactants, higher alkylamines, quaternary ammonium salts, pyridine or like heterocyclic compounds, phosphonium, sulfonium or like cationic surfactants, carboxylic acids, sulfonic acids, phosphoric acids, anionic surfactants containing sulfuric acid ester groups, phosphoric acid ester groups or like acidic groups, aminoacids, aminosulfonic acids, sulfuric or phosphoric esters of aminoalcohols or like ampholytic surfactants. A suitable amount of the inorganic material is about 5% by weight and of the organic material is about 0.5 to 1% by weight, each based on the weight of the ferromagnetic material.

Some of these surfactant compounds used as the anti-static agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, German Patent Application (OLS) 1,942,665, British Pat. Nos. 1,007,317 and 1,198,450, R. Oda et al., *Synthesis of the Surface Active Agents and Their Applications*, Maki Shoten (1964), A. M. Perry et al., *Surface Active Agents*, Interscience Publications Inc., (1958), J. P. Sisley et al., *Encyclopedia of Surface Active Agents*, Vol. 2, Chemical Publishing Co., (1964), and *Surface Active Agent Handbook*, 6th Edition, Sangyo Tosho K.K., (Dec. 20, 1966).

These surface active agents can be used individually or as mixtures. The surfactant is used not only for inhibiting the formation of static electricity but also for improving the dispersing, lubricating and coating properties and the magnetic properties of the resulting recording member.

The formation of the magnetic recording layer can be carried out by dispersing the iron oxide mixture in an organic solvent and applying the resulting composition on a support. A suitable coating thickness of the magnetic layer on the support ranges from about 0.5 to 20 $\mu$m, preferably 2 to 15 $\mu$m.

The non-magnetic support can have a thickness of about 2.5 to 100 $\mu$m, preferably 3 to 40 $\mu$m, for a tape, and suitable supports are polyethylene terephthalate, polyethylene naphthalate or like polyesters, polypropylene or like polyolefins, cellulose triacetate, cellulose diacetate or like cellulose derivatives, polyvinyl chloride or like vinyl resins, polycarbonate or like synthetic resins, aluminum, copper or other metals, glass or ceramics, etc.

Useful organic solvents for kneading the iron oxide particles and coating the resulting composition are acetone, methyl ethyl ketone, methyl isobutyl ketone, cyclohexanone or like ketones, methanol, ethanol, propanol, butanol or like alcohols, methyl acetate, ethyl acetate, butyl acetate, ethyl lactate, glycol acetate monoethyl ether, or like esters, diethyl ether, glycol dimethyl ether, glycol monoethyl ether, dioxane or like ethers, benzene, toluene, xylene, or like aromatic hydrocarbons, methylene chloride, ethylene chloride, carbon tetrachloride, chloroform, ethylene chlorohydrin, dichlorobenzene or like chlorinated hydrocarbons, etc.

For coating the iron oxide containing mixture on a support, an air doctor coating method, a blade coating method, an air knife coating method, a squeeze coating method, a dip coating method, a reverse roll coating method, a transfer roll coating method, a kiss coating method, a cast coating method, and a spray coating method can be used. The details of these coating methods are described in *Coating Engineering*, pp. 253 to 277, Asakura Shoten (March 20, 1971).

The magnetic iron oxide obtained by the process of this invention has increased magnetic anisotropy in the longitudinal directions, and increased coercive force (Hc). Furthermore, magnetic recording media obtained by using the magnetic iron oxide in accordance with this invention have good orientation, high squareness ratio and increased coercive force as a result of the increased magnetic anisotropy, and therefore, have improved recording characteristics from low-frequency to high frequency and good sensitivity.

The following Examples are given to illustrate the present invention more specifically. It will be readily understood to those skilled in the art that the components, proportions, the procedural order, etc., shown in these Examples can be changed without departing from the scope and spirit of this invention, and accordingly, these examples are not to be construed as limiting the invention. Unless otherwise indicated herein, all parts, percentages, ratios and the like are by weight.

EXAMPLE 1

285 g of magnetic iron oxide (FeO$_{1.34}$, Hc=440 Oe) was finely pulverized, and dispersed in 2.5 liters of water. Then, 16.9 g of cobalt chloride was dissolved in 500 ml of water, and the resulting aqueous solution was added to the above magnetic iron oxide slurry. The mixture was stirred for 30 minutes. 30 ml of a 29% aqueous ammonia solution was added to the slurry at an equal rate over the course of 1 minute, and the mixture was further stirred for 30 minutes, followed by washing with water to produce a slurry of magnetic iron oxide coated with cobalt hydroxide. The resulting slurry was designated Slurry A.

In the same way as above, Slurries B to D were prepared in accordance with the formulations shown in Table 1 below.

TABLE 1

| Slurry | Magnetic Iron Oxide | Cobalt Chloride (g/500 ml of water) |
|---|---|---|
| A | FeO$_x$, x = 1.34 (Hc = 440 Oe) | 16.9 |
| B | FeO$_x$, x = 1.39 (Hc = 442 Oe) | 16.7 |

TABLE 1-continued

| Slurry | Magnetic Iron Oxide | Cobalt Chloride (g/500 ml of water) |
|---|---|---|
| C | FeO$_x$, x = 1.43 (Hc = 445 Oe) | 16.6 |
| D | γ-Fe$_2$O$_3$ (Hc = 400 Oe) | 16.4 |

A direct current magnetic field having a magnetic intensity of 800 Oe was applied to 30 g of each of the Slurries A to D, and ultrasonic vibration was also applied to form a precipitate. Water was removed, and the precipitate was slowly dried at 60° C. to form blocks of oriented needle-like particles corresponding to Slurries A to D.

Each of the blocks was heat-treated at 350° C. for 1 hour in an atmosphere of nitrogen while applying a magnetic field of 800 Oe in the orienting direction. Then, each of the blocks was cooled at a rate of 5° C./min. The coercive force of the ferromagnetic powders was about 500 to about 600 Oe.

The resulting magnetic iron oxide powders (Powders A to D) were each mixed and dispersed in a ball mill in accordance with the following formulation, and the resulting mixture was coated on a 20 μm-thick polyethylene terephthalate film in a dry thickness of 10 μm, oriented in a direct current magnetic field of 1,000 Oe, and dried at 80° C. The resulting tape was slit to a width of ½ inch to form Tapes A to D.

| Formulation | |
|---|---|
| Magnetic Iron Oxide Powder (A to D) | 300 parts by weight |
| Nitrocellulose | 80 parts by weight |
| Lecithin | 3 parts by weight |
| Methyl Ethyl Ketone | 350 parts by weight |

The magnetic characteristics of these Tapes A to D were measured in an external magnetic field of 1,500 Oe using a B-H tracer (Hystoroscope, Model DH 403A for 50 Hz, a product of Nippon Kagaku Kogyo K.K.). The results obtained are shown in Table 2.

TABLE 2

| Tape | Coercive Force (Hc) (Oe) | Squareness Ratio (Br/Bs) |
|---|---|---|
| A | 544 | 0.77 |
| B | 573 | 0.83 |
| C | 575 | 0.82 |
| D | 502 | 0.78 |

On the other hand, ultrasonic vibration was applied to the slurry of magnetic iron oxide (FeO$_{1.39}$) (Sample B) above without orientation to form a precipitate. Water was removed, and the precipitate was dried to form a block of needle-like particles. Without applying a magnetic field, the block was heat-treated and cooled in the same manner as above to form a magnetic iron oxide powder. A magnetic tape was produced from this powder in the same way as above. The tape had a coercive force (Hc) of 556 Oe and a squareness ratio (Br/Bs) of 0.76.

As a result, the cooling treatment in a magnetic field was confirmed to have the effect of increasing the coercive force and squareness ratio. It was also ascertained that the effect of this invention was exhibited more with FeO$_x$ in which x is 1.36 to 1.49.

EXAMPLE 2

Carboxymethyl cellulose as a thickener was added to 30 g of Slurry B obtained in Example 1 until the viscosity of the slurry reached 50 poises. The slurry was subjected to orientation in a direct current magnetic field of 800 Oe, and dried slowly at low temperatures to form a block. The block was heat-treated at 350° C. for 1 hour in an atmosphere of nitrogen while a magnetic field of 800 Oe was applied in the direction of the orientation of the particles, followed by cooling at a rate of 5° C./min to form a magnetic iron oxide.

Using the resulting magnetic iron oxide, a magnetic tape was produced in the same way as in Example 1, and the magnetic characteristics of the tape were measured under the same conditions as in Example 1. The tape obtained was found to have a coercive force of 565 Oe and a squareness ratio of 0.84.

EXAMPLE 3

285 g of magnetic iron oxide (FeO$_{1.39}$, Hc=442 Oe) was finely pulverized, and dispersed in 2.5 liters of water. Then, 36 g of cobalt chloride was dissolved in 500 ml of water, and the resulting aqueous solution was added to the above magnetic iron oxide slurry. The mixture was stirred for 30 minutes. 65 ml of a 29% ammonia aqueous solution was added to the slurry over the course of 1 minute at an equal rate. The mixture was further stirred for 30 minutes, and washed with water to produce a slurry of magnetic iron oxide coated with cobalt hydroxide. Carboxymethyl cellulose as a thickener was added to 300 g of the resulting slurry until the viscosity of the slurry reached 60 poises. The slurry was subjected to orientation in a magnetic field of 400 Oe, and dried slowly at 60° C. to form a block. The block was magnetized in the orienting direction.

Without applying an external magnetic field, the magnetized block was heat-treated at 350° C. for 1 hour in an atmosphere of nitrogen, and then cooled at a rate of 5° C./min.

Using the resulting magnetic iron oxide powder, a magnetic tape was produced in the same way as in Example 1, and the magnetic characteristics of the tape were measured. The magnetic material was found to have a coercive force (Hc) of 1,050 Oe and a squareness ratio (Br/Bs) of 0.82.

The above results confirmed that in the present invention, auto-magnetic annealing has the same effect as ordinary cooling a magnetic field. Furthermore, it was confirmed that when a magnetic tape is produced from the magnetic iron oxide prepared by the process of this invention, the squareness ratio (Br/Bs) is higher than that of a conventional Co-containing γ-Fe$_2$O$_3$, and that the coercive force (Hc) also was increased for the same Co content.

While the invention has been described in detail and with reference to specific embodiments thereof, it will be apparent to one skilled in the art that various changes and modifications can be made therein without departing from the spirit and scope thereof.

What is claimed is:

1. A process for preparing magnetic iron oxide, which comprises,
    (a) coating the surface of needle-like particles of magnetic iron oxide with a cobalt compound, said iron oxide having the formula FeO$_x$ wherein x is from about 1.36 to 1.49,
    (b) placing the coated iron oxide particles in a unidirectionally oriented magnetic field of at least about 300 Oe, thereby to orient most of the needle-like particles in the direction of said magnetic field, (c) heat-treating said needle-like particles at a temperature of from about 200° to 800° C., in an atmosphere of inert gas, and
(d) conducting said heat treating while said needle-like particles are in a magnetized state or, if said needle-like particles are not in a magnetized state, then conducting said heat treating while simultaneously applying an external magnetic field to said needle-like particles.

2. The process of claim 1 wherein said needle-like magnetic iron oxide particles contain from about 0.5 to about 10 atomic percent of Co based upon the total atomic percent of said iron oxide particles.

3. The process of claim 1, wherein said inert gas is $N_2$, He, Ne, Ar, Kr or Xe.

4. The process of claim 3, wherein the heat-treating temperature is 200° to 800° C.

5. The process of claim 1, wherein the heat-treating temperature is from about 300° to 400° C.

6. The process of claim 4, wherein the heat-treating temperature is from about 300° to 400° C.

7. The process of claim 1, wherein said cobalt compound is selected from the group consisting of cobalt oxides, cobalt-containing oxides, cobalt inorganic acid salts, cobalt organic acid salts, cobalt hydroxides, cobalt-containing hydroxides, metallic cobalt and cobalt alloys.

8. The process of claim 1, wherein said cobalt compound is cobalt oxide or cobalt hydroxide.

9. The process of claim 1, wherein said needle-like iron oxide particles have an average particle length of 0.2 to 2 $\mu$m.

10. A magnetic recording material comprising the magnetic iron oxide prepared by the process of claim 1.

* * * * *